March 9, 1937.  A. T. HARDING ET AL  2,073,060
CAPACITOR
Filed Jan. 31, 1934
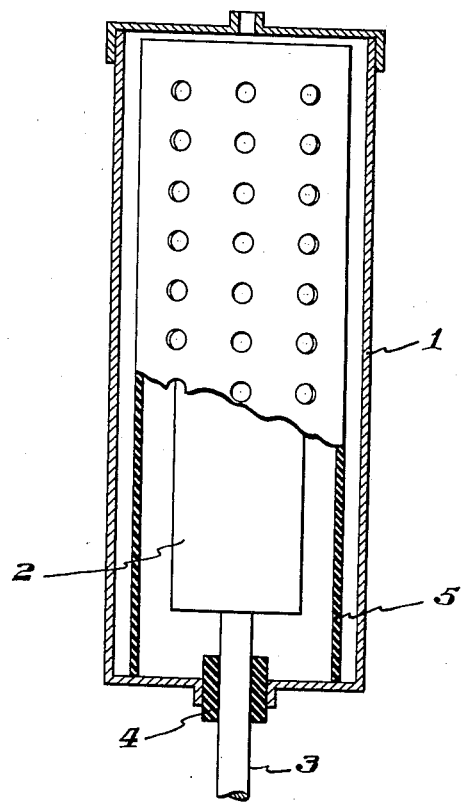
INVENTORS:
Arthur T. Harding.
Frank S. Dunleavey
BY R. Goldsborough
ATTORNEY Patented Mar. 9, 1937

2,073,060

UNITED STATES PATENT OFFICE 2,073,060

CAPACITOR

Arthur T. Harding, Audubon, and Frank S. Dunleavey, West Collingswood, N. J., assignors to Radio Corporation of America, a corporation of Delaware Application January 31, 1934, Serial No. 709,116

10 Claims. (Cl. 175—315)

Our invention relates to electric capacitors and, more particularly, to capacitors of the wet electrolytic type.

As is well known to those skilled in the art, a wet electrolytic capacitor of the type usually used in radio receivers is constituted by a container, of either inert or filming material, which serves as the cathode if the capacitor is to be utilized in a direct current circuit, and a central filmed anode generally supported by a riser which extends upward through an insulating gasket or the like disposed in an opening in the bottom of the container. Such capacitors are exemplified by U. S. Patents Nos. 1,867,249, 1,874,111, 1,880,263 and 1,934,515 and British Patent 377,277. Usually, the anode has been preformed. That is to say, it has been provided with a hard, tough dielectric film which is not appreciably attacked by the electrolyte in the container over a long period of time. Heretofore, the anode film has been formed in situ by immersing a cleaned anode in a relatively dilute formation bath and passing current between it and the bath over a long period of time. Under certain circumstances, the anode may also be formed through immersion in a concentrated bath over a short period of time, but it has been found that if such an anode is assembled in the finished capacitor in an electrolyte which is more dilute than the forming electrolyte, the film generally exhibits unstable characteristics.

It is, accordingly, an object of our invention to provide a new and improved method for forming a stable anodic film on an aluminum electrode.

Another object of our invention is to provide a new and improved method whereby an electrolytic capacitor having extremely stable characteristics may be manufactured.

Another object of our invention is to provide a forming method for electrolytic capacitor anodes that shall shorten the voltage building time of the completely assembled capacitor.

Another object of our invention is to provide an aluminum anode forming method that shall permit the use of an electrolyte in the finished capacitor of any concentration equal to or different from that of the formation electrolyte.

Another object of our invention is to provide an anode forming method that shall permit the use in the finished capacitor of an electrolyte having the same or greater pH value than that of the forming electrolyte.

And a still further object of our invention is to provide a capacitor manufacturing method such that the shelf life of the finished product shall be greatly enhanced.

The foregoing objects and other objects ancillary thereto we prefer to accomplish by forming the anode film in two stages in forming solutions having definite pH values, and thereafter assembling the formed anode within the cathode container in an electrolyte having a higher pH value than that of the first forming electrolyte.

The novel features that we consider characteristic of our invention are set forth with particularity in the appended claims. The invention itself, however, both as to its organization and its method of operation, together with additional objects and advantages thereof will best be understood from the following description of a specific embodiment, when read in connection with the accompanying drawing.

The single figure of the drawing is a conventionalized sectional view of a wet electrolytic condenser of the general type exemplified by the patents hereinbefore referred to. Such a condenser usually comprises a container-cathode 1, and a central filmed anode 2 supported by a riser 3 which extends upward through an insulating gasket 4 or the like disposed in an opening in the bottom of the container. It is customary, in electrolytic condensers of the type to which our invention pertains, to preclude contact between the anode and the cathode-container by interposing a spacer 5. In our device the spacer is preferably formed of hard rubber. The spacer is usually perforated to permit free circulation of the electrolyte, as exemplified by the patent to Tyzzer 1,934,515.

In view of the fact that capacitors of the general type to which our invention pertains are old and well known, it is to be clearly understood that we make no claim to the structural configuration of the device shown in the drawing, the said drawing being for the sole purpose of exemplifying the relative positions of anode, spacer and cathode-container.

Before going into the details of our improved capacitor manufacturing method, we wish to point out that we have discovered that the shelf life of a wet electrolytic capacitor is greatly affected by the borax concentration of the first forming solution. By shelf life is meant the tendency of the anodic film to deteriorate during such periods as the capacitors are not subjected to voltage. By varying the borax content of the first forming solution, we have discovered that it is possible to improve the shelf life characteristics of the finished capacitors. Merely by way of example, a forming solution which gives excellent results is constituted by 1902 grams of boric acid, 80 grams of anhydrous sodium tetra borate, and 19 liters of water. This solution gives very excellent results, but by increasing the amount of anhydrous borax to say 97 grams, or by decreasing it to 73 grams, marked deterioration of the capacitors during shelf life has been noted.

Coming now to our preferred method. The aluminum anodes which have previously been crimped, if desirable, are stacked vertically in a container and boiled for ten minutes or more in a solution containing 10 grams of sodium carbonate ($Na_2CO_3$) per litre of water. At the end of this period, impurities and dirt will be found at the surface of the liquid and they are removed, preferably, by flooding the container with an excess of fresh water, allowing the impurities and dirt to be washed either over the sides of the container or through a drain spout provided for this purpose.

After this treatment, the anodes are next boiled in water for fifteen minutes, removed and rinsed. In view of the fact that the presence of impurities such as sodium chloride (NaCl) are very detrimental to the life of the finished capacitor, we next boil the anodes for forty-five minutes in a solution consisting of ten grams of sodium tetra borate ($Na_2B_4O_7$) per litre of water, once more thoroughly washing the boiled anodes after this treatment. After washing, the anodes are next boiled for forty-five minutes in water, removed, rinsed and then subjected to an etching process.

We have established, by experiment, that if the anodes are etched to a greater or less degree before the formation process, the film which is formed in the said process is much more resistant to corrosion. Therefore, we give the cleaned anodes an etching treatment by boiling them for fifteen minutes in a solution consisting of 12.5 cubic centimeters of concentrated nitric acid per litre of water. We then remove them and wash them well with clear water before subjecting them to the formation process proper.

Leaving the anodes for the moment, attention is called to the fact that if spacers are used in the finished capacitor, they also should be thoroughly cleaned to remove all traces of NaCl and other detrimental impurities. As a spacer material for interposition between the anode and the cathode container, we prefer to use a hard rubber sheet which may be provided with a plurality of small perforations such as are shown in the spacer disclosed in the Tyzzer Patent No. 1,934,515. According to a statement of the patentee, Mershon, made during the prosecution of the application which resulted in Patent No. 1,874,111, rubber was considered entirely unsatisfactory for use as a spacer. From our experiments, however, we have determined that rubber is perfectly satisfactory as a spacer, provided that it is properly cleaned. We, therefore, boil the rubber spacers for at least an hour in a solution consisting of 10 grams of sodium hydroxide (NaOH) per litre of water. The spacers are then removed, rinsed with clear water and the boiling and rinsing is repeated three or more times, making a total of at least four separate boilings, the total time devoted to boiling and rinsing being at least four hours.

Subsequent to the boiling treatment, the spacers are boiled for at least an hour in a solution of 10 grams of sodium tetra borate ($Na_2B_4O_7$) per litre of water. The spacers are then removed, rinsed in water and the same process is repeated once more, giving a total of two separate, one hour sodium tetra borate treatments.

After the sodium tetra borate treatment, the spacers are preferably boiled for one hour in clear water, removed and rinsed and boiled once more in clear water, making a total of two separate, one hour clear water rinsing treatments.

In the event that rubber vents or valves and rubber insulating stoppers are used, their cleaning treatment is identical with the treatment of the hard rubber insulating spacers.

As a result of our experiments, we have determined that the cathode containers, if made of aluminum, the same material that is utilized for the anodes, should not be subjected to quite so strenuous a cleaning process. At least, if the finished capacitor is intended for use in connection with direct current circuits, it is best that the inner surface of the container be fairly well resistant to film formation. Such being the case, we omit the etching process when cleaning the cathode containers. Accordingly, the said containers, caps and rivets, if any are to be used, are cleaned by immersing them in a boiling solution consisting of ten grams of sodium tetra borate ($Na_2B_4O_7$) per litre of water for a period of only 15 seconds and are then removed and washed with clear water. After washing, the parts are immersed in clear boiling water for a period of fifteen seconds, removed therefrom and rinsed well with clear water.

Going back now to the anode formation process, as before stated, the formation of the film on the crimped aluminum anodes, according to our invention, is carried out in two stages, each involving distinctly different electrolytes or forming solutions. These solutions hereinafter will be referred to as the "A" and "B" solutions.

After cleaning, the anodes are assembled to the formation racks for support and immersed in the solution contained in the "A" formation tank. This solution is fairly concentrated and consists of from 132–3 grams anhydrous sodium tetra borate ($Na_2B_4O_7$), 1902 grams orthoboric acid ($H_3BO_3$) to 19 litres of water, or in some cases from 73–97 grams anhydrous sodium tetra borate ($Na_2B_4O_7$), 1902 grams orthoboric acid ($H_3BO_3$) to 19 litres of water. The two types of solution are identical in concentration save for borax content and the use of either will depend upon the voltage at which it is considered desirable to form the anodes. For instance, if it is desired to form the anodes at 460 volts the "A" formation tank containing from 132–3 g. of anhydrous sodium tetra borate ($Na_2B_4O_7$) will be used. If anodic formation at 475 volts is desired, then the "A" tank containing from 73–97 grams of anhydrous sodium tetra borate ($Na_2B_4O_7$) will be employed. It is understood, of course, that any particular weight of sodium tetra borate included within these given limits may be employed at the corresponding formation voltages given above and that any particular weight greater or less than that specified in the limits cited above will be employed accordingly as the desired formation voltage is lower or higher than that given above. For instance, if a formation voltage in excess of 475 volts be desired, the particular weight of anhydrous borax used will be less than 73 grams or if a voltage of formation less than 460 volts be desired a particular weight of anhydrous borax greater than 133 grams will be used. For intermediate voltages between 460 and 475 volts the particular weight of anhydrous borax used will be between 133 and 97 grams, the particular weight in each case being determined by the formation voltage used.

After immersion of the anodes in the "A" formation tanks, the voltage across the anodes and the formation tank itself acting as cathode is built to the desired predetermined level by employing a constant current density of about .05 amperes per mfd. A slightly greater or lesser current density may also be used. Under these conditions, the voltage across the formation tank is built in from 40 to 60 minutes, the exact time being influenced by such considerations as composition of the aluminum used in the manufacture of the anodes or the temperature of the tank solution. During the building period and subsequently, the temperature of the formation tank is held between 94° C.–97° C. After reaching the desired formation voltage, the voltage is allowed to remain constant while the leakage current decreases continually. This process continues for 13½ hours after reaching maximum formation voltage during which period the temperature of the solution remains from 94° C.–97° C.

Formation in the "B" solution:

After forming in the "A" solution for 13½ hours, it is necessary to stabilize the anodic film in a solution approximating in composition and concentration the solution used as electrolyte in the finally assembled unit. The voltage of formation in the "B" solution is approximately the same as that in the "A" solution. It is never lower than the "A" formation voltage but may be slightly higher.

After formation for the required length of time in the "A" solution, the anodes are removed and placed in the "B" formation tank. The voltage across this tank is built in the same manner as is the case with the "A" formation tank. The temperature of the "B" formation solution is maintained from 80° C. to 95° C. In the "B" formation tank the anodes are kept at constant voltage at the required temperature for a period of eight hours, from the time the voltage is built across the tank. At the end of this period the "B" tank is cooled to room temperature by means of running water or some other suitable external method of cooling. From the start of the cooling procedure the "B" formation is allowed to run for three hours, more or less, at constant voltage. At the end of this period, the anodes are removed, washed well with water and assembled.

The composition and concentration of the solution used in the "B" formation tank is wherever possible the same as that of the electrolyte used in the final assembly of the capacitor or when this is not possible, an approximation is made. For instance, a capacitor with a rated peak voltage of 450 volts may be formed at 460 volts. The can solution of such a unit will consist of 33 grams orthoboric acid ($H_3BO_3$) and 5 grams ammonium borate ($NH_4HB_4O_7$) per litre of water. In this case, the "B" solution will be the same. However, such a unit may be formed at 475 volts in which case the "B" solution will consist of 33 grams orthoboric acid ($H_3BO_3$) and 3 grams ammonium borate per litre of water, while the can solution will remain the same as cited above.

In case it is desired to substitute borax ($Na_2B_4O_7$) for ammonium borate ($NH_4HB_4O_7$) in the can, or operating electrolyte, the corresponding change will be made in the "B" tank formation solution. In any case, the object of the "B" formation is to stabilize the anodic film in a solution of the same composition and concentration or of approximately the same composition and concentration as the can electrolyte used in the final assembly.

In both forming steps, the films are formed at the voltage of incipient scintillation. This is true, irrespective of the concentration of the electrolyte and the forming time. It is our opinion that this fact is an important feature of our improved process and that it has an extremely important bearing on the stability of the films.

Through actual measurement, we have determined that the pH of the specific "A" forming solution chosen for example is 6.07, and the pH of the "B" forming solution is 6.54. In addition, the pH of the electrolyte actually used in the finished capacitor has a value of 6.54, which it will be especially noted is higher than that of the first formation electrolytes. Although these specific pH values have been given by way of example, we are not limited thereto. We have attained quite good results with an "A" solution having pH values between 6.07 and 6.39, a "B" solution ranging from 6.39 to 6.54, and capacitor electrolytes having pH values as high as 7.0. In any event, however, we utilize a final capacitor solution having a higher pH than the "A" solution, for best results. The operating electrolyte of the capacitor is thus characterized as having suitable "film-retaining" properties. Our improved process, therefore, runs counter to processes heretofore recommended in that the final container electrolyte has a higher pH value than the forming electrolyte and, therefore, is actually more alkaline than the said formation electrolytes. We are unable to actually account for this fact, but it is our belief that the second or stabilizing formation stage is largely responsible for the ability of the films to remain intact in the more basic container electrolyte.

From a consideration of the foregoing, it will be apparent that we have provided an improved anode film formation method and an improved method of manufacturing electrolytic capacitors of the wet type. Certain modifications of our invention will be apparent to those skilled in the art to which it pertains without departing from the underlying principles thereof. Our invention, therefore, is not to be limited except insofar as is necessitated by the prior art and by the spirit of the appended claims.

We claim as our invention:

1. The method of manufacturing wet electrolytic capacitors which comprises forming an anodic film on an aluminum electrode in a film-forming electrolyte having a predetermined pH value, stabilizing the film in an electrolyte having a higher pH value and thereafter assembling the electrode into a container in a film-retaining electrolyte having a higher pH value than that of the first forming electrolyte.

2. The method set forth in claim 1 wherein the pH of the forming electrolyte lies between 6.07 and 6.39, and the pH of the final capacitor solution is of the order of 7.0.

3. The method set forth in claim 1 wherein the capacitor electrolyte has a pH value of substantially 6.54.

4. The method set forth in claim 1 characterized in that the pH of the first electrolyte lies between 6.07 and 6.39, the pH of the second electrolyte lies between 6.39 and 6.54 and the pH of the final electrolyte is of the order of 7.000.

5. The method of forming an anodic film on an electrode of filming metal which comprises immersing the electrode in a film-forming electrolyte having a pH value between 6.07 and 6.54 causing an electric current to pass between the electrode and the electrolyte and maintaining the voltage of the order of that of incipient scintillation.

6. In a capacitor of the wet electrolytic type, a film-retaining electrolyte having a higher pH value than that of a film-forming electrolyte in which one of the electrodes of the capacitor was first formed, and having a pH value at least as high as that of a film-forming electrolyte in which said electrode was subsequently formed.

7. The step in the method of forming an anodic film on an electrode of filming metal which comprises immersing the electrode in a hot film-forming electrolyte causing an electric current to pass between the electrode and the electrolyte and maintaining a potential between the electrode and the electrolyte while permitting the latter to cool, thereby preventing the film from being attacked by the electrolyte during the cooling operation.

8. The step set forth in claim 7 characterized in that the electrolyte has a pH value between 6.07 and 6.54.

9. The step set forth in claim 7 characterized in that the electrolyte has a pH value above 6.07.

10. The method of shortening the voltage-building time of an electrolytic capacitor which comprises utilizing a film-forming electrolyte to deposit on an anode a film forming material, stabilizing the film of said material in a different electrolyte and thereafter immersing the film in a film-retaining electrolyte having a higher pH value than that of the first referred to electrolyte.

ARTHUR T. HARDING.
FRANK S. DUNLEAVEY.